(No Model.) 2 Sheets—Sheet 2.
J. H. THOMAS.
HAY TEDDER.
No. 329,506. Patented Nov. 3, 1885.
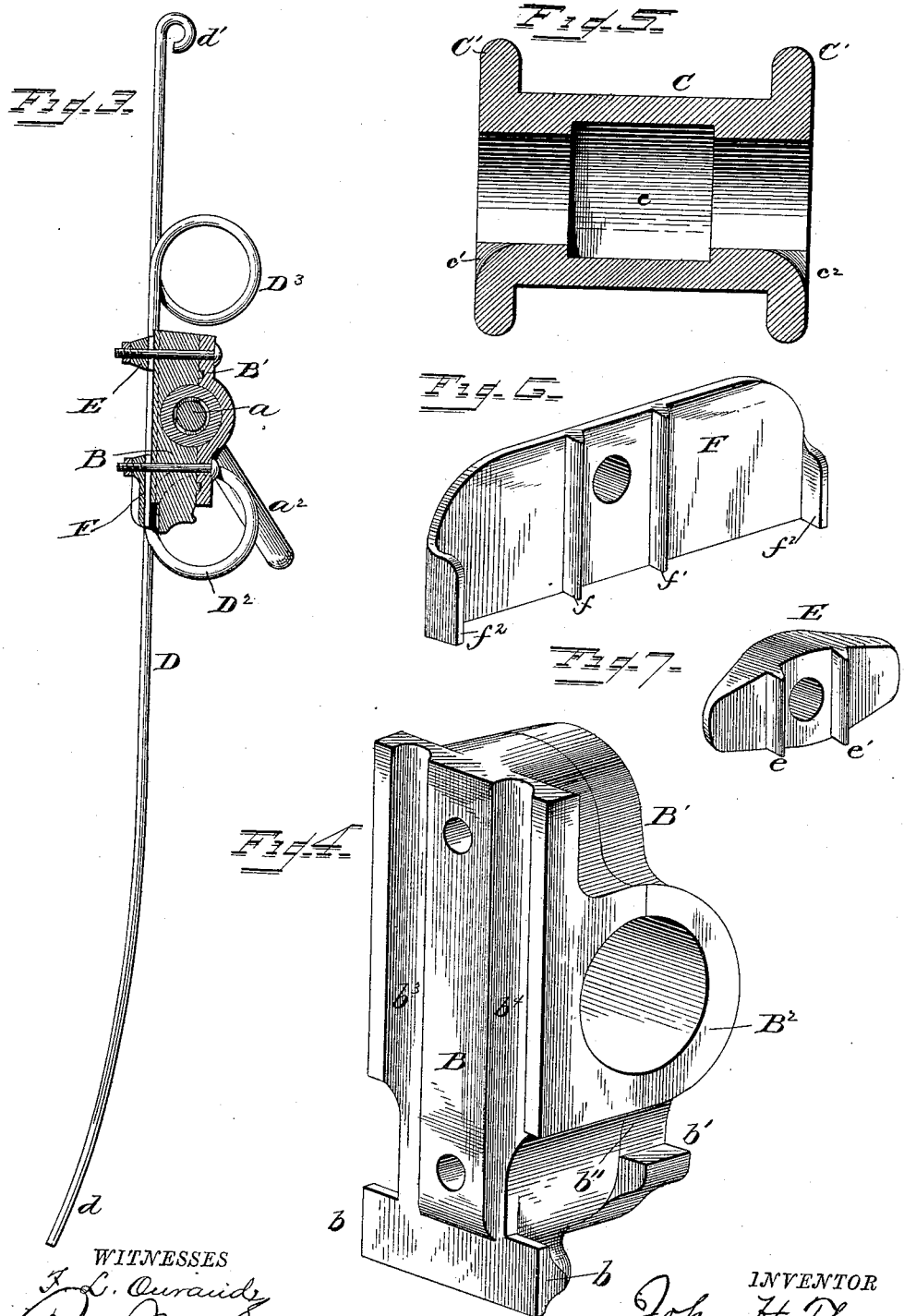
WITNESSES
INVENTOR
John H. Thomas
by A. M. Smith
Attorney

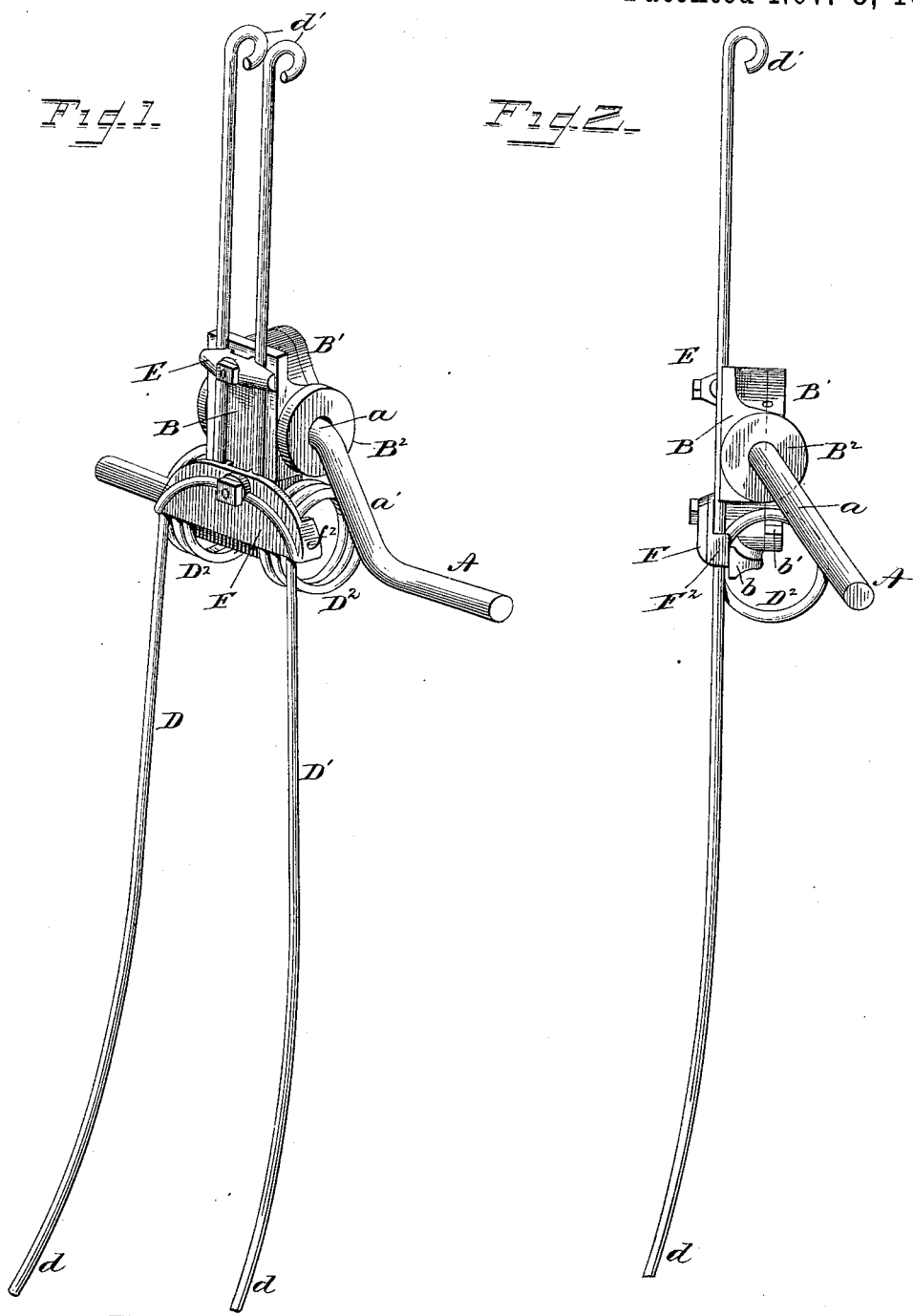

UNITED STATES PATENT OFFICE.

JOHN H. THOMAS, OF SPRINGFIELD, OHIO.

HAY-TEDDER.

SPECIFICATION forming part of Letters Patent No. 329,506, dated November 3, 1885.

Application filed November 7, 1884. Serial No. 147,334. (No model.)

*To all whom it may concern:*

Be it known that I, JOHN H. THOMAS, of Springfield, county of Clark, and State of Ohio, have invented a new and useful Improvement in Hay-Tedders, of which the following is a full, clear, and exact description, reference being had to the accompanying drawings, making part of this specification.

My invention relates to the construction and arrangement of the forks or teeth of the tedder, whereby the elasticity of the portions thereof acting on the grass is increased and their liability to injury from striking obstructions consequently diminished; also to the construction of the fork crank-box and the arrangement of the coils of the forks or teeth relative thereto and to the actuating-crank, as hereinafter fully explained.

In the accompanying drawings, Figure 1 is a perspective view of a tedder-fork and crank-box, with a portion or single crank of the crank-shaft with which the crank-box is connected. Fig. 2 is a side elevation of, and Fig. 3 a vertical section through, the same; and Figs. 4, 5, 6, and 7, views of the crank-box and parts connected therewith, in detail.

The tedder to which my improvements are to be applied will be similar in construction and general arrangement of its parts to those in common use and well known, in which a series of forks are moved through elliptical paths by a series of cranks on a shaft in rear of and parallel with the main axle, from the carrying-wheels of which motion is communicated to the crank-shaft, and it will therefore not be described in detail further than is necessary to an understanding of my improvements.

Of the parts shown and indicated by letters in the accompanying drawings, A represents a portion of the crank-shaft, showing a single crank; B B', the two parts of the divided crank-box, and C the enlarged crank wrist or spool surrounding and fast on the crank portion of the shaft. The spool or enlarged wrist C is cast or otherwise formed separate from the shaft, and is slipped on the rod or blank from which the crank-shaft is to be formed, previous to bending the latter and forming the cranks therein. It is provided with a central longitudinal perforation to receive the blank, said perforation being, by preference, enlarged at $c$ in the central portion of the spool, for the purpose of making the latter as large as is desired without unnecessary weight of metal, and is provided at its ends with peripheral flanges C', in close proximity with the sides of the fork crank-box, for preventing lateral movement of the latter. The ends of the perforation in the spool are intended to fit snugly in the crank $a$, and on the sides thereof, adjacent to the arms of the crank, curved notches or depressions $c'$ $c^2$ are formed to receive the bends between the arms $a'$ $a^2$ and the crank $a$, this construction serving to obviate the necessity which would otherwise exist of making such bends between the crank and crank-arms abrupt in order to prevent lateral movement of the spool on the crank, and also to insure the spool or enlarged wrist against rotation on the crank $a$. The enlargement of the perforation at $c$ also serves to render the bends in the crank less abrupt, as the crank may curve outward from the notches $c'$ $c^2$ into such enlarged portion of the perforation.

The two parts B B', forming the divided crank-box, or the sleeve portion $B^2$ thereof, are of such width as to fill in between the flanges C' of the spool sufficiently close to prevent relative lateral movement without interfering with the free rotation of the spool in the box. The part B, forming the larger part or body of the box, for convenience will be called the "box," and the part B', which, while it has one-half of the bearing for the crank formed in it, serves to hold the crank to the main portion, and will, for like reason, be called the "cap." The cap B' has lateral projections or spurs $b'$ formed upon it below the sleeve portion $B^2$, around which spurs and within depressions at $b''$ between said spurs and the sleeve $B^2$ the coils on the fork or teeth pass. The part B has similar depressions formed in its sides below the sleeve, within which the coils pass, and below said depressions is provided with lateral spurs $b$, which also enter the coils in the forks or teeth. The outer face of the part B is, by preference, grooved longitudinally at $b^3$ $b^4$ to receive the teeth D D', which are securely clamped therein by means of clamping-plates E and F, which may be secured to the box by the same bolts which unite the two parts thereof, as shown. The plates E and F have ribs $e$ $e'$ and $f$ $f'$ formed upon them, which extend inward toward the box between the teeth and assist the grooves in the crank-box in holding the teeth against displacement, and the ends of the lower clamping-plate, F, overhanging the coils in the teeth, are provided with flanges $f^2$, which project inwardly on the outer sides of the coils of the teeth and prevent them from spreading. The grooves for the teeth may be formed in the clamping-plates E and F, if desired, instead of in the box, or in both; but the construction described is preferred. The forks or teeth D D' are formed of any usual or suitable metal, and are provided immediately below the crank-box sleeves $B^2$ with coils $D^2$, which pass around the spurs on the lower ends of the boxes, as explained, the upper outer face of the coils resting in contact with the sleeve portion $B^2$ of the boxes, for preventing the teeth from slipping upward, the spurs $b'$, projecting within the coils $D^2$ at their upper sides, preventing the teeth from slipping downward. The spurs $b$ serve to take the backward thrust on the teeth and to relieve the latter of heavy strain at that point where they are held in the grooves of the crank-box. By locating the coils of the forks or teeth in the described relation to the crank-boxes they are removed as far as practicable from the points $d$ or operative parts of the teeth, thereby giving increased length, and consequent elasticity, to the ends of the teeth below the coils, and the coils are brought into compact shape and wholly or in part within the sweep of and between the arms $a'$ $a^2$ of the cranks when the latter are at the upper portion of their path of movement. The lugs or spurs on the crank-boxes and on the plates clamping the teeth thereto effectually prevent displacement of the teeth, and serve to hold them in compact working relation thereto. The teeth are shown with heel-extensions above the crank-boxes, provided with eyes at $d'$, through which they may be attached to any usual or suitable form of supporting-links or radius-bars connecting them with the frame; but they may, if desired, terminate in the crank-box, and the latter may have a wooden bar connecting it with the swinging links. I prefer, however, to extend the elastic teeth themselves, as giving them increased elasticity, and consequently greater capacity to yield to obstructions, which would be liable to injure them. For still further increasing their elasticity, I sometimes form the teeth with additional coils, $D^3$, above the crank-box, and arranged, preferably, in close proximity thereto, so as to fall within the sweep of the crank-arms in the lower portion of their throw; but this is not essential, the main point being to increase the length, and consequent capacity to yield, of the heel-extensions of the crank-teeth above the crank-boxes and between said boxes and the swinging supporting-links.

In another application filed by me (patent since issued, dated April 28, 1885, No. 316,498) the teeth are shown secured to the crank-box by means of a grooved clamping-plate provided with an arm or extension having at its end a cylindrical cross-head, the arms of which enter the coils of the teeth for preventing end movement of the latter. This I do not claim herein; but,

Having now described my invention, I claim as new—

1. The combination, with the fork crank-box of a hay-tedder, of forks or teeth secured to said box, and provided with coils located between the operative ends of the teeth and said box and in contact with the latter, for preventing end movement of the teeth relatively to the box, and arranged to move between the arms of and to fall within the path of the actuating-crank in the upper portion of said path, substantially as described.

2. The combination, with the fork crank-box, of the forks or teeth provided with coils between said box and the ends of the teeth, and also with coils in their heel-extension above said box, substantially as described.

3. The crank-box provided with lateral spurs engaging and in combination with coils in the forks or teeth arranged to move between the arms of and to fall within the path of the actuating-crank in the upper portion of said path, substantially as described.

4. The fork crank-box provided with grooves to receive and hold the forks or teeth, and lugs or spurs for preventing the downward slipping of and receiving the strain on the forks, in combination with forks or teeth provided with coils engaging said spurs and resting in contact with the crank-boxes, for preventing the teeth from slipping upward, substantially as described.

5. The crank-box composed of two parts, B and B', provided with the spurs $b$ and $b'$, in combination with the clamping-plates E and F, for uniting the teeth to said box, the latter provided with the inwardly-projecting flanges $f^2$, substantially as and for the purpose described.

6. The spool C, forming the enlarged crank-wrist, provided with the central perforation, with the wall thereof notched or recessed at the ends of the spool, for the purpose and substantially as described.

7. The combination, with the fork-actuating tedder-crank, of the enlarged wrists or spools C, the grooved crank-box provided with the lateral spurs $b$ and $b'$, the forks or teeth provided with coils located in the described relation to said crank, crank-box, and spurs, and the clamping-plates for uniting said teeth to the crank-box and preventing them from spreading, substantially as described.

In testimony whereof I have hereunto set my hand.

JOHN H. THOMAS.

Witnesses:
A. P. LINN COCHRAN,
WM. S. THOMAS.